W. PRIOR AND W. PRIOR, Jr.
MACHINE FOR CUTTING BIAS STRIPS.
APPLICATION FILED MAR 17, 1921.
1,432,207.
Patented Oct. 17, 1922.
4 SHEETS—SHEET 2.
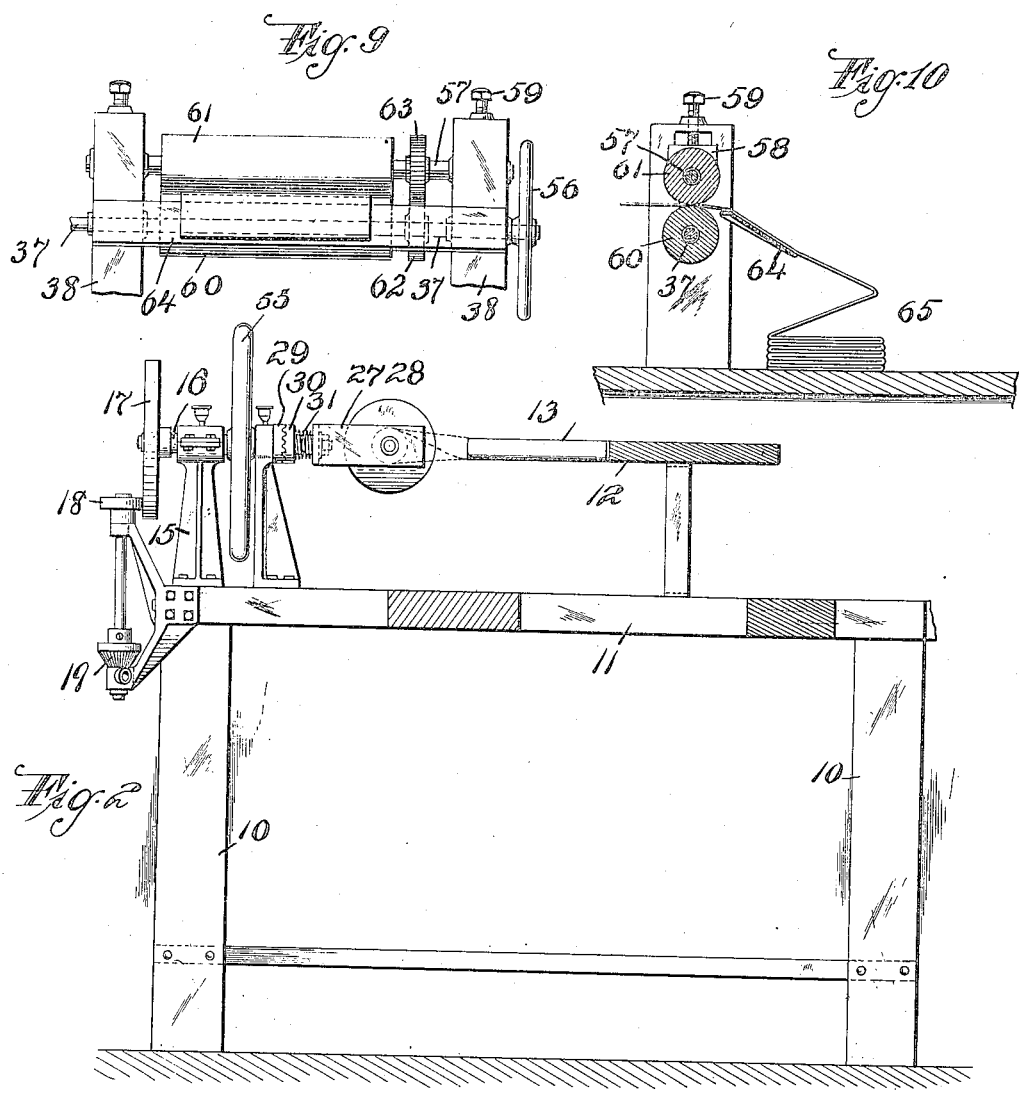
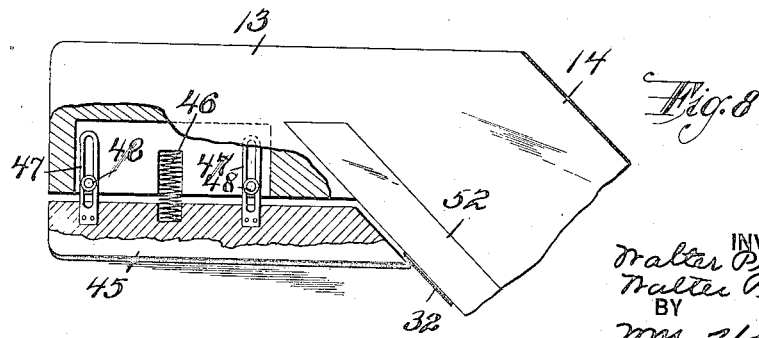

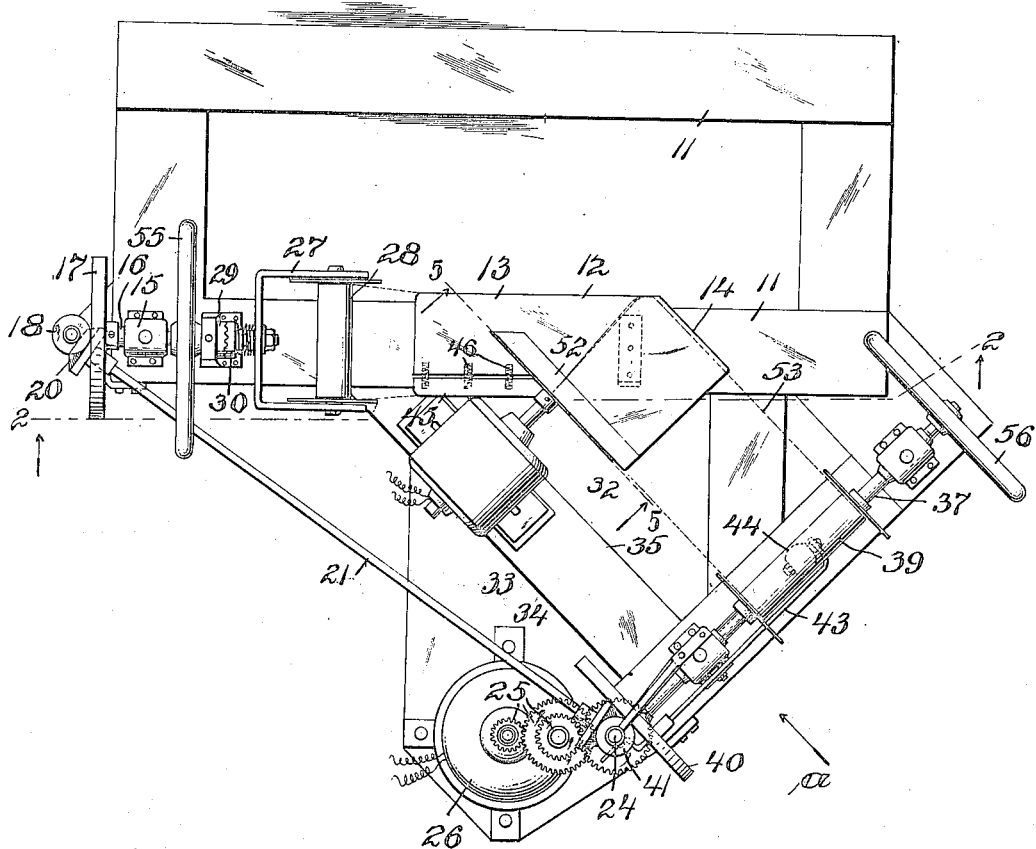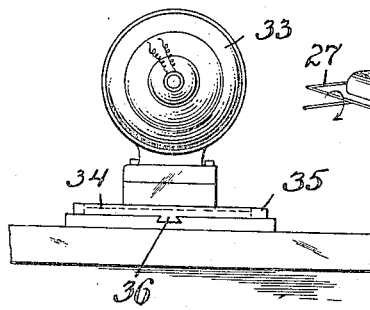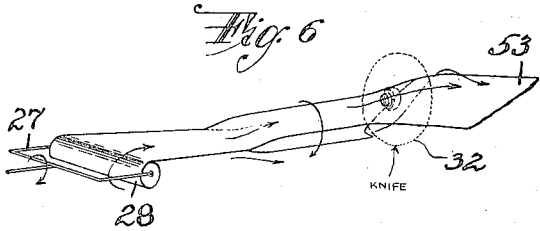

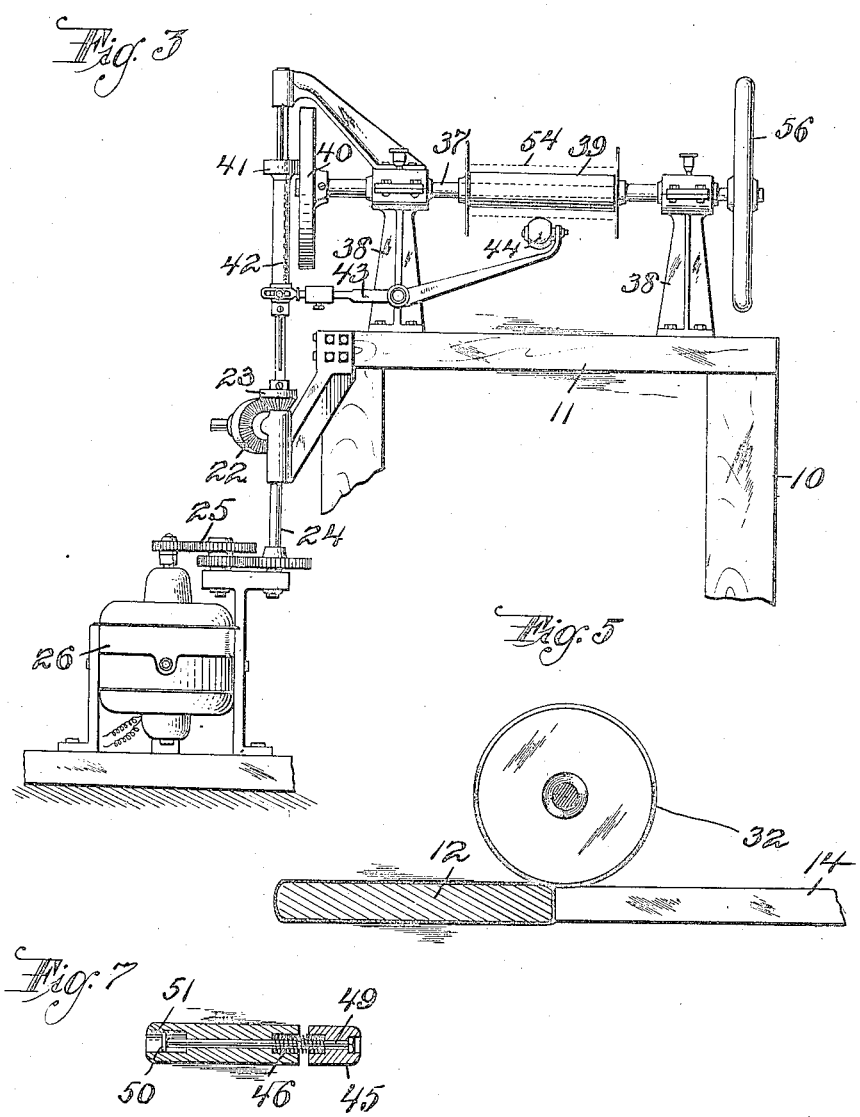

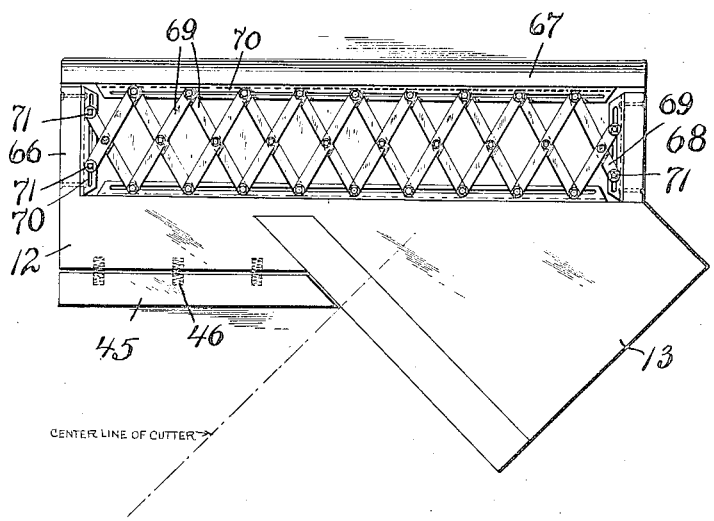
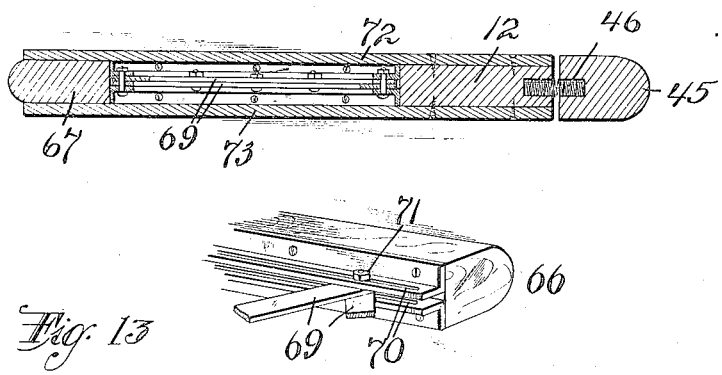

Patented Oct. 17, 1922.

1,432,207

UNITED STATES PATENT OFFICE.

WALTER PRIOR, OF EAST ORANGE, AND WALTER PRIOR, JR., OF SOUTH ORANGE, NEW JERSEY.

MACHINE FOR CUTTING BIAS STRIPS.

Application filed March 17, 1921. Serial No. 453,183.

*To all whom it may concern:*

Be it known that we, WALTER PRIOR and WALTER PRIOR, Jr., citizens of the United States, and residents of East Orange, county of Essex, and State of New Jersey, and South Orange, county of Essex, and State of New Jersey, respectively, have invented certain new and useful Improvements in Machines for Cutting Bias Strips, of which the following is a specification.

This invention relates to an improved machine of the type which cuts bias strips from a tube or sleeve of fabric by rotating the sleeve and pulling and winding the strip, cut at an angle, from the sleeve.

The invention is designed to provide such a machine which is compact and is easily operable, having feeding and a winding mechanism situated at the opposite ends of a mandrel to feed the material steadily so as to make a uniform bias strip.

The invention is designed to also provide a winding mechanism which securely and tightly winds the material and which is automatically regulated, so that the winding is also under substantially the same tension.

A further object of the invention is to uniformly feed and turn the sleeve of fabric and to provide a mandrel which keeps the sleeve taut and flat and thus insures a straight edged bias strip of the same width throughout.

The invention is illustrated in the accompanying drawings, in which Figure 1 is a top view of a machine embodying our improvements, and Figure 2 is a section on line 2—2 in Figure 1. Figure 3 is a fragmentary view showing the end of the machine, looking in the direction of the arrow *a* in Figure 1. Figure 4 is a detail view showing the means for mounting the motor of the knife. Figure 5 is an enlarged section of a detail taken on line 5—5 in Figure 1. Figure 6 is a diagrammatic view showing the course of the fabric. Figure 7 is a detail cross-section of part of the mandrel, showing a modified form of construction, and Figure 8 is a top view, broken away, showing a part of the mandrel and illustrating the means of adjustment. Figures 9 and 10 show a modified take-up means, and Figures 11, 12 and 13 show a modified mandrel.

The machine is mounted on a suitable frame work 10, the upper flat portion 11 of which is provided with a mandrel 12. The mandrel 12 has an elbow which connects the straight portion 13 of the mandrel and the angular part 14. The mandrel is illustrated in the form of a table, but any construction that causes the tube of fabric, fed to the machine, to be stretched and substantially flat and taut is applicable. Opposite one end of the mandrel is a means for feeding the fabric and, while feeding it, giving it a suitable twist. Such feeding means is mounted in a bearing 15 which supports a shaft 16 and is driven by suitable mechanism, such as the friction disks 17 and 18, the disk 18 being driven by a miter gear 19 in mesh with the gear 20 on the shaft 21, which has a gear 22 which is operated from a gear 23 on the shaft 24, which, in turn, is rotated by suitable gearing 25 from a motor 26.

On the shaft 16 is mounted a bracket 27, into which a spool 28 can be inserted, the bracket 27 being preferably provided with a tension means 29, one member of which is fastened to the collar 16 and the other member 30 being connected with the bracket 27 and having a suitable spring 31, so that when excess pressure is being directed to turn the bracket 27 the members 29 and 30 will slip so as to give a momentary relief to such tension.

The tubular or sleeve-like roll of fabric is wound on the spool 28, from which it passes to the straight part 13 of the mandrel 12, and it is cut at the angle in the elbow by a knife 32 arranged in a plane transverse to the plane of the mandrel. The knife is usually driven by a motor, such as the motor 33, which motor is adjustable laterally by reason of the slots 34 in the plate 35, which plate in itself can slide, as shown in Figure 4, as by means of the dove-tail connection 36. This permits an adjustment toward and from the angular part of the mandrel, and also toward and from the angle at the inner side of the elbow.

The goods, after being cut, is kept under tension by a suitable take-up mechanism so that the bias strip just before, while it is being, and also just after it is cut is flat and even, insuring a straight edge where the bias strip is cut. The machine, it will be noted, has a positive feeding means for rotating the roll of tubular fabric before the sleeve or tube gets to the mandrel, and it has a take-up mechanism to keep the sleeve rotating and to keep the cut strip taut. The mandrel itself needs no elements on it to assist the feeding, this being due to the shape of the mandrel. The mandrel is so formed, either of spaced rods or as a table, in fact, in many different forms, as to stretch the fabric substantially flat and thus feed a flat strip of cloth to the cutting mechanism, and also to minimize the friction on the sleeve of fabric.

The take-up means sometimes in the form of a winding mechanism may comprise a shaft 37 mounted in suitable standards 38, on which the winding spool 39 is attached, and friction disks 40 and 41 transmit power from the shaft 24 to the shaft 37. The friction disk 41 is arranged on a movable sleeve 42 which slides on the shaft 24 and is actuated by a lever 43 which has a roller 44 on the end of it which roller is in contact with the goods that are wound on the spool 39. We prefer to arrange one edge of the mandrel, preferably the inner edge, with a strip 45 which can be adjusted toward and from the main part of the table to fit it to slight inequalities, or to also adjust it to different sizes of sleeve-like or tubular strips of fabric.

In Figure 8 we show a spring 46 for forcing the strip 45 outward, and suitable slotted arms 47 and screws 48 can be utilized, if desired, for holding the strip in alignment and also for fastening the strip in position when such fastening is considered necessary.

In Figure 1 we illustrate a row of springs 46, and in Figure 7 we show a modification in which a plunger 49 with the head 50 in the the recess 51 limits the outward movement of the strip 45. A strip 52 of soft metal, such as lead, is usually arranged where the knife 32 is placed to prevent damage to the knife if it accidentally engages the edge of the table.

We show, in Figures 9 and 10, a take-up mechanism which can be operated without the automatic control, and which shows the shaft 37 mounted, as before, in the bearings 38, and a jack shaft 57 is arranged in movable bearings 58, so that the pressure between the rolls 60 and 61, mounted on these shafts, can be regulated. These rolls are made of suitable material, and we may use soft rubber for this purpose to provide a good friction. Gears 62 and 63 are in mesh and insure the rotation of the rolls in unison.

A plate 64 is usually installed to lead the material away from the rolls, and any usual device or mechanism can be used to pile the material, as shown at 65.

In order to adapt the machine for different sizes of tubular material and to permit its adjustment we provide an adjustable mandrel, one form of which is shown in Figures 11, 12 and 13. In this form the mandrel 12 has the front edge 66, which is fixed, and has a side edge 67 and a rear edge 68 which are formed of strips that are movable, the main part of the mandrel and these end and side strips being connected by toggles 69. The ends of these toggles are arranged in slots 70 in the various elements to which they are attached, and securing means, such as the nuts 71, can be used for holding the toggles in adjusted positions.

It will thus be evident that if the nuts 71 are loosened and the end 68 pushed inward, the toggles will operate to push the strip 67 outward and a larger sleeve of material can be used on the machine without wrinkling when it is cut. The strip 45 and the spring 46 can be used as above described for the purpose of taking up slight differences in diameter of the sleeve.

To provide a smooth surface we may provide the top slab 72 and the bottom slab 73, shown in Figure 12, these being secured fixedly to the mandrel 12 and permitting the side strip 67 to slide between them.

As to the cutting operation it will be noted that the knife is arranged so that it cuts near the top edge of the table and in the angle between the parts 12 and 13 of the table, and when the knife is adjusted so that it will have a proper shearing action against the strip 52 it will cut the fabric without any wrinkling or distortion of the fabric.

The tubular strip of material, when passing from the spool 28 onto the straight part 13 of the mandrel 12, is rotated on the flat part of the table, such rotation being caused, first, by the pull on the strip 53 that has been cut by the knife 32, and also by a twisting of the spool 28 by reason of the bracket 27 being slowly rotated. This assists the rotation and any excess movement is relieved by a suitable tension, such as typified at 29, so that the rotation of the spool 28 is at about the same rate as, but slightly in advance of, the rotation of the sleeve on the mandrel 12.

The strip 53, when it is cut, may be wound up, and as the winding proceeds, the roll of material, as at 54 in Figure 3, becomes larger. This forces the roller or other suitable contact means 44 down and the lever 43 then moves the sleeve 42, so that the friction disk 41 slides toward the outer edge of the friction disk 40, and as the wound spool becomes larger its speed is reduced to compensate for the increased diameter, as will be evident.

We have found, by the use of this machine, that strips of even width can be expeditiously made and evenly wound on a machine that requires but a small space. In order to successfully start the machine, or to run it by hand, if desired, we provide the hand wheels 55 and 56 on the feeding and winding means, respectively. The adjustability of the motor 33, and consequently its knife, permits the location of the knife at any particular desirable point relative to the size of the sleeve of material to be cut and provides at all times a proper shearing action with the plate 52.

We claim:

1. A machine for cutting bias strips comprising a mandrel with an elbow therein, a knife at the angle of the elbow, means for rotating a sleeve of fabric on the straight part of the mandrel, and a winding means at the end of the angular part of the table, and means actuated by the material being wound for controlling the speed of the winding means.

2. A machine for cutting bias strips comprising a flat mandrel with an elbow therein, a knife at the angle of the elbow, means for supporting and turning a roll of tubular material which is fed to the mandrel in the form of a sleeve, a take-up means at the end of the angular part of the mandrel, and means for operating the supporting roll and the take-up means.

3. A machine for cutting bias strips comprising a flat mandrel with an elbow therein, a knife at the angle of the elbow, means for supporting and twisting a roll of material which is fed to the mandrel in the form of a sleeve, a take-up means for material that comes from the angular part of the table, means for operating the supporting roll and the take-up means, and means on the straight part of the mandrel for stretching the sleeve of material so that it is kept taut laterally.

4. A machine for cutting bias strips comprising a mandrel with an elbow therein, the mandrel having its straight part provided with a spring-actuated strip at the edge and having a slit at the angle of the mandrel, a knife adjustable in said slit, fabric holding means on the end of the straight part of the mandrel, and winding means at the end of the angular part of the mandrel for drawing off the fabric.

5. A machine for cutting bias strips comprising feeding means, take-up means, a flat mandrel with an elbow therein, a strip on the straight part of the mandrel and normally slightly spaced from the straight and also the angular part of the mandrel, means for moving the strip laterally, and a knife operating against the angular part of the mandrel adjacent to the strip.

6. In a machine for cutting bias strips, a flat mandrel having a straight part and an angular part, a strip on the straight part on the edge opposite the angular part, and means for securing said strip in laterally adjusted positions.

7. In a machine for cutting bias strips, a flat mandrel having a straight part and an angular part, a strip on the straight part on the edge opposite the angular part, toggles connecting the strip with the main part of the mandrel, and means for securing the toggles in various adjusted positions.

8. In a machine for cutting bias strips, a flat mandrel having a straight part and an angular part, a strip on the straight part on the edge opposite the angular part, means for securing said strip in laterally adjusted positions, and a yielding strip on the other edge of the straight part of the mandrel.

9. A machine for cutting sleeves of fabric into bias strips comprising a flat mandrel to hold the sleeves flat and taut, a knife arranged at an angle to the mandrel, means for rotatably feeding the sleeve to one end of the mandrel, and a take-up means for pulling the strip after it is cut.

10. A machine for cutting sleeves of fabric into bias strips comprising a flat mandrel with an elbow therein, means for passing the sleeve over the mandrel, said means consisting only of a rotating sleeve-supporting means at one end of the mandrel, and a take up means at the other end, and a knife for cutting said sleeve at a point in its rotation.

11. A machine for cutting sleeves of fabric into bias strips comprising a mandrel to hold the sleeve taut and flat, a knife disposed so as to cut the sleeve obliquely into strips, and means located at the ends of the mandrel for rotating the sleeve on the mandrel and drawing the cut strips from the mandrel.

12. A machine for cutting sleeves of fabric into bias strips comprising a mandrel to hold the sleeve taut and flat, a knife disposed so as to cut the sleeve obliquely into strips, means located at the ends of the mandrel for rotating the sleeve on the mandrel and drawing the cut strips from the mandrrel, and mechanism for operating said means in unison.

13. A machine for cutting bias strips from a sleeve of fabric, said machine comprising a mandrel formed so as to hold the sleeve of fabric taut and flat, a knife disposed so as to cut said sleeve at an angle to form a continuous bias strip, and feeding and take-up means for rotating the sleeve on the mandrel and keeping the fabric taut while it is cut.

In testimony that we claim the foregoing, we have hereto set our hands, this 15th day of March, 1921.

WALTER PRIOR.
WALTER PRIOR, Jr.